(12) United States Patent
Kondo et al.

(10) Patent No.: US 6,320,910 B2
(45) Date of Patent: *Nov. 20, 2001

(54) APPARATUS FOR HIERARCHICAL ENCODING OF DIGITAL IMAGE SIGNALS WITH IMPROVED ENCODING EFFICIENCY

(75) Inventors: Tetsujiro Kondo; Yasuhiro Fujimori; Kunio Kawaguchi, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/501,740

(22) Filed: Feb. 11, 2000

Related U.S. Application Data

(63) Continuation of application No. 08/251,173, filed on May 30, 1994, now abandoned.

(30) Foreign Application Priority Data

May 31, 1993 (JP) ........................................ 5-152836
Aug. 30, 1993 (JP) ........................................ 5-237431

(51) Int. Cl.$^7$ ................................................ H04N 7/12
(52) U.S. Cl. ................................ 375/240.27; 382/232
(58) Field of Search ........................ 375/240, 240.02, 375/240.09; 348/390.1, 400.1, 404.1, 408.1; 382/232, 234, 236, 238, 237; H04N 7/12

(56) References Cited

U.S. PATENT DOCUMENTS

| | | |
|---|---|---|
| 4,222,076 | 9/1980 | Knowlton . |
| 5,136,391 | 8/1992 | Minami . |
| 5,959,676 * | 9/1999 | Kondo ............................ 348/421.1 |
| 5,966,179 * | 10/1999 | Kondo et al. .................. 375/240.24 |
| 6,219,456 * | 4/2001 | Kondo et al. .................. 382/240 |

FOREIGN PATENT DOCUMENTS

| | | |
|---|---|---|
| 0 392 753 | 10/1990 | (EP) . |
| 0 497 058 | 8/1992 | (EP) . |
| 0 627 859 | 12/1994 | (EP) . |

OTHER PUBLICATIONS

IEEE Transactions on Computers, vol. C–28, No. 11, Nov. 1, 1979, New York, US pp. 871–874 K.R. Sloan et al. 'Progressive Refinement of Raster Images'.

Optical Engineering, vol. 28, No. 7, Jul. 1, 1989, Bellingham, WA, US pp. 708–716, XP33797 L. Wang et al. 'Reduced–difference Pyramid: a Data Structure for Progressive Image Transmission' p. 709, par. 2—pp. 712, par. 3.

* cited by examiner

*Primary Examiner*—Nhon T Diep
(74) *Attorney, Agent, or Firm*—Frommer Lawrence & Haug LLP; William S. Frommer; Dennis M. Smid

(57) ABSTRACT

An input digital video signal is encoded to produce at least first and second hierarchical data signals which respectively represent a first video signal and a lower resolution video signal. Each pixel data signal of the second hierarchical data signal is calculated as an average of N pixel data signals of the input digital video signal. The second hierarchical data signal is output together with first hierarchical pixel data signals representing only N−1 of the N pixel data signals of the input digital video signal. The first hierarchical pixel data signals may be differential signals produced by subtracting each of the N−1 pixel data signals from the average value of the N pixel data signals. During decoding the Nth pixel data signal is reconstructed from the N−1 pixel data signals and the average value provided as the corresponding second hierarchical pixel signal.

21 Claims, 9 Drawing Sheets

APPARATUS FOR HIERARCHICAL ENCODING OF DIGITAL IMAGE SIGNALS WITH IMPROVED ENCODING EFFICIENCY

This application is a continuation of Ser. No. 08/251,173 filed May 31, 1994 abandoned.

BACKGROUND OF THE INVENTION

1. Field of the Invention

This invention relates to an hierarchical encoding apparatus which divides a digital image signal into a plurality of signals that represent images having different respective resolutions, and encodes such signals for transmission. The invention also relates to a corresponding hierarchical decoding apparatus.

2. Description of Related Art

There has been proposed a digital image signal encoding technique in which a high resolution image signal is received as a first hierarchical image signal, a second hierarchical image signal having a lower resolution than the first signal is formed therefrom, a third hierarchical image signal having a lower resolution than the second is formed, and so forth. This technique is referred to as a hierarchical encoding technique. According to this technique, a plurality of hierarchical image signals are transmitted through a single transmission path (one communication channel or one recording and reproducing process). on the receiving side, the transmitted image data can be reproduced by a television monitor corresponding to any one of the hierarchical levels.

More specifically, it is known to use video signals having various degrees of resolution, such as standard resolution, high resolution, and low resolution. Conventional television signals are an example of standard resolution video signals. High definition television signals are an example of high resolution video signals. Low resolution video signals may be used, for example, to retrieve image data at high speed from an image data base and to display the same on a computer display. The hierarchical encoding technique may be used for enlargement and reduction of images, as well as for providing video signals of varying degrees of resolution. Hierarchical encoding may be applied to reduction of images without changing the level of resolution.

FIG. 8 illustrates an example of an apparatus which carries out the above-described hierarchical encoding technique. According to this example, the apparatus outputs three levels of hierarchical signals, with the number of pixels in the second hierarchical image signal being one-quarter of the number of pixels in the first hierarchical image signal and the number of pixels in the third (highest) hierarchical image signal being one-sixteenth of the number of pixels in the first hierarchical image signal. As shown in FIG. 8, an input digital image signal, corresponding to the first hierarchical signal, is provided at an input terminal 41. The input signal is supplied from the input terminal 41 to a thin-out circuit 42 and a subtracting circuit 43. The output of the thin-out circuit 42 is provided to an encoding circuit 45 through another thin-out circuit 44. The output of the encoding circuit 45 is provided at a third hierarchical output terminal 53. The thin-out circuits 42 and 44 each reduce the number of pixels in the input signal supplied thereto by one half in both of the horizontal and vertical directions. Thus, the number of pixels in the output signal of each of the thin-out circuits 42 and 44 is one-quarter of the number of pixels in the respective input signal for those circuits. Accordingly, the number of pixels in the output signal of the thin-out circuit 44 is one-sixteenth of the number of pixels in the input signal for the thin-out circuit 42.

The encoding circuit 45 encodes the signal output from the thin-out circuit 44 and provides a resulting encoded signal to the output terminal 53. Typically, the thin-out circuits 42 and 44 are formed of thin-out filters.

In addition, the signal output from the thin-out circuit 42 is supplied to an interpolating circuit 46 and a subtracting circuit 47. The interpolating circuit 46 performs interpolation to supply pixels that have been thinned out by the thin-out circuit 42. The output signal from the interpolating circuit 46 is supplied to the subtracting circuit 43, which calculates the difference, pixel by pixel, between the input image signal provided at input terminal 41 and the output signal from the interpolating circuit 46. The resulting differential signal is supplied from the subtracting circuit 43 to an encoding circuit 48, which is, in turn, connected to provide an encoded output signal to a first hierarchical output terminal 51.

The output signal from the thin-out circuit 44 is supplied to a subtracting circuit 47 by way of an interpolating circuit 49. In a similar manner to the subtracting circuit 43, the subtracting circuit 47 calculates a differential value, pixel by pixel, between the output signal from the thin-out circuit 42 and the interpolated output signal from the interpolating circuit 49. The differential signal provided by the subtracting circuit 47 is supplied to an encoding circuit 50, which, in turn, supplies an encoded output signal to a second hierarchical output terminal 52. In general, the interpolating circuits 46 and 49 are formed of interpolating filters. The encoding circuits 45, 50, and 48 perform compression-encoding upon the input signals supplied thereto.

Encoded differential signals corresponding to the first and second hierarchies are respectively provided at the output terminals 51 and 52, and an encoded signal (not a differential signal) corresponding to the third hierarchy is provided at the output terminal 53. It will be seen that in the conventional hierarchical encoding apparatus of FIG. 8 higher-order hierarchical signals are obtained by thinning out lower-order hierarchical signals. With respect to each of the lower-order hierarchical signals, the apparatus forms differential data by subtracting an input signal from a higher-order interpolated signal. Then the highest-order signal, and the differential data in the other signals, are compression encoded.

A decoding apparatus which corresponds to the encoder of FIG. 8 is illustrated in block diagram form in FIG. 9. As shown in FIG. 9, the transmitted first, second and third hierarchical signals are respectively received by the decoding apparatus at input terminals 61, 62 and 63. A decoding circuit 64 is supplied with the third hierarchical signal received through the input terminal 63, and a decoded output signal from the decoding circuit 64 is provided as a third hierarchical output signal at an output terminal 73. The signal output from the decoding circuit 64 is also supplied to an interpolating circuit 67.

The encoded differential signal corresponding to the second hierarchical level is supplied from the input terminal 62 to a decoding circuit 65 and the decoded differential signal output from the decoding circuit 65 is supplied to an adding circuit 68. The adding circuit 68 adds the interpolated signal output from the interpolating circuit 67 and the differential signal received from the decoding circuit 65 to form a second hierarchical output signal which is provided at an output terminal 72. The output signal from the adding circuit 68 is also provided as an input signal to an interpolation circuit 69.

An encoded differential signal corresponding to the first hierarchical level is provided to a decoding circuit 66 from the input terminal 61. The decoding circuit 66 outputs a decoded differential signal which is supplied to an adding circuit 70. The adding circuit 70 adds an interpolated signal output from the interpolating circuit 69 and the decoded differential signal received from the decoding circuit 66 to form a first hierarchical output signal which is supplied to an output terminal 71.

In the above-described conventional hierarchical encoding technique, as the number of hierarchical signal levels is increased, the amount of data to be transmitted also disadvantageously increases. For example, when two hierarchical signal levels are provided with thinning out at a rate of 1:4, the amount of data to be transmitted is increased by a factor of 1.25 (1+¼). With similar thinning out and three hierarchical levels, the amount of data is increased by a factor of about 1.31 (1+¼+¹⁄₁₆). As the number of hierarchies increases, the number of pixels to be transmitted also continues to increase. Thus, it will be seen that there is a trade-off in conventional hierarchical encoding techniques between encoding efficiency and the number of hierarchical signal levels to be provided.

It should also be noted that according to the conventional encoding scheme described above, data compression is achieved by encoding differential values obtained with respect to input image data and reference image data formed by interpolating a thinned out signal. This interpolation process must then be duplicated on the decoder side to provide a reference image signal to which the transmitted differential value can be added. However, the need to interpolate at the decoder side results in delay and a relatively large hardware scale.

OBJECTS AND SUMMARY OF THE INVENTION

Accordingly, it is an object of the present invention to provide a method and apparatus for performing hierarchical encoding on a digital image signal without reducing encoding efficiency and with decreased delay and hardware scale on the decoding side. It is also an object to provide a decoding apparatus and method corresponding to the encoding apparatus and method.

In accordance with an aspect of the present invention, there is provided an apparatus for encoding an input digital video signal to produce at least first and second hierarchical data signals which respectively represent a first video signal and a second video signal having a resolution that is lower than a resolution of the first video signal, with the apparatus comprising means for receiving the input digital video signal and for generating the second hierarchical data signal by calculating each pixel data signal of the second hierarchical data signal as a linear combination of N pixel data signals of the input digital video signal, and means for outputting the generated second hierarchical data signal together with first hierarchical pixel data signals representing only N−1 of the N pixel data signals of the input digital video signal.

According to another aspect of the invention, the means for receiving and generating includes means for calculating an average value of four pixel data signals a, b, c, d of the input digital video signal to produce a pixel data signal m1 of the second hierarchical data signal. According to yet another aspect of the invention, the apparatus further includes means for subtracting the average value pixel data signal m1 from each of the input pixel data signals a, b, c to produce differential data signals Δa, Δb, Δc, with the average pixel data signal m1 being output as a pixel data signal of the second hierarchical data signal, and the differential data signals Δa, Δb, Δc being output as the first hierarchical pixel data signals representing only the N−1 pixel data signals of the input digital video signal.

In accordance with still another aspect of the present invention, there is provided an apparatus for decoding first and second hierarchical data signals which respectively represent a first video signal and a second video signal having a resolution that is lower than a resolution of the first video signal, with the apparatus including means for receiving a pixel data signal of the second hierarchical data signal and data signals representing N−1 pixels of the first hierarchical data signal, and means for calculating an Nth pixel data signal of the first hierarchical data signal from the received pixel data signal of the second hierarchical data signal and the received data signals representing N−1 pixels of the first hierarchical data signal.

According to still further aspects of the invention, N=4 and the means for calculating calculates the Nth pixel data signal by subtracting a sum of the received data signals representing the N−1 pixels from four times the received pixel data signal of the second hierarchical data signal; and, alternatively, the received data signals representing the N−1 pixels are differential signals, and the means for calculating calculates the Nth pixel data signal by subtracting a sum of the received data signals representing the N−1 pixels from the received pixel data signal of the second hierarchical data signal.

With the encoding technique in accordance with the present invention, a higher-order hierarchical signal is formed as an average value of lower-order signals, so that data representing a lower-order pixel (or corresponding differential data) can be omitted from transmission and then reconstructed on the receiving side. In this way, the number of pixels to be transmitted does not increase with provision of hierarchical signal levels. Further, the time required for calculation on the decoder side is decreased, thereby permitting high speed processing for decoding. Further, the hardware scale on the decoder side in relatively small.

The above, and other objects, features and advantages of the present invention will be apparent from the following detailed description thereof which is to be read in connection with the accompanying drawings.

DETAILED DESCRIPTION OF THE PREFERRED EMBODIMENTS

A first preferred embodiment of the invention will now be described with reference to FIGS. 1–3.

Figure 1:
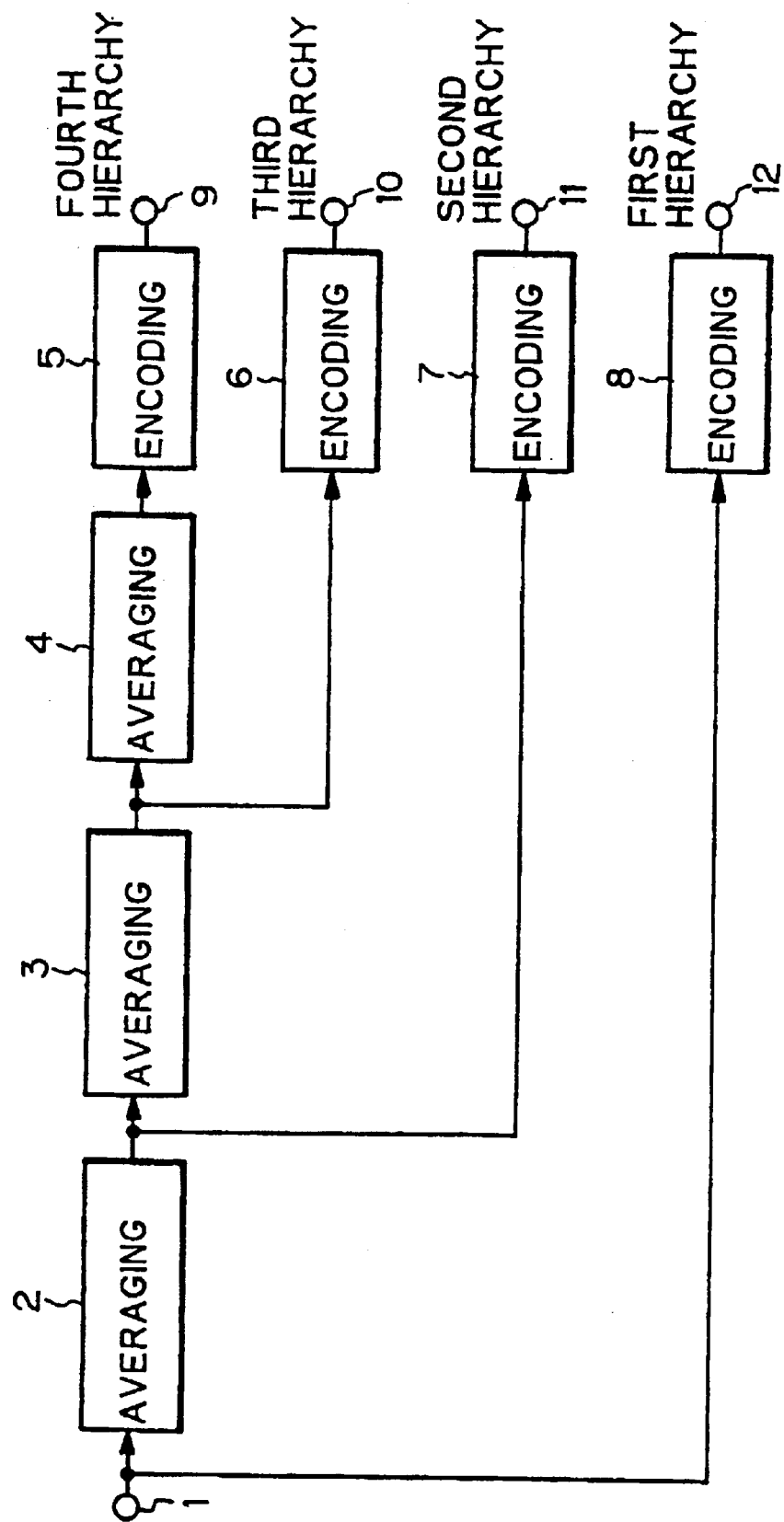
FIG. 1 is a block diagram of an encoding apparatus according to a first embodiment of the present invention.

As shown in FIG. 1, an encoder for providing four hierarchical image signals in accordance with the first embodiment includes an input terminal 1 to which an input digital image signal is supplied. An averaging circuit 2 is connected to receive the input digital image signal, and the input digital image signal is also supplied to an encoding circuit 8.

According to the first embodiment, a first hierarchical signal is formed directly from the input signal, by encoding at the encoding circuit 8, and is output via a first hierarchical output terminal 12.

Figure 3:
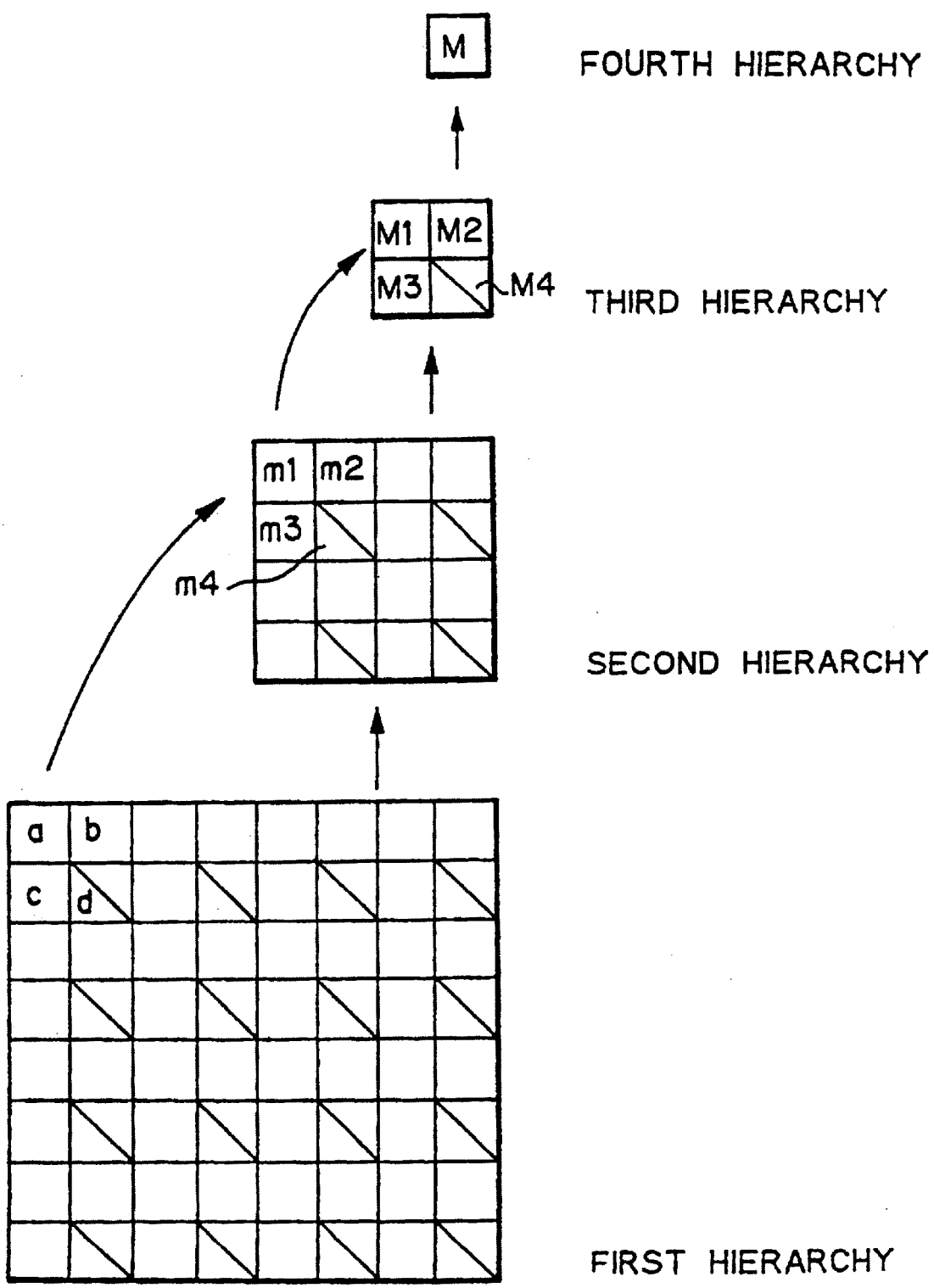
FIG. 3 is a schematic illustration of hierarchical encoding performed according to the first embodiment of the invention.

FIG. 3 schematically illustrates images corresponding to the first through fourth hierarchical signals. A portion (8 pixels by 8 pixels) of the image corresponding to the first hierarchy, which is also the input image, is shown in the lower-most portion of FIG. 3. In FIG. 3, each square represents one pixel.

Thus, the averaging circuit 2 outputs an average value of four pixels (2 pixels by 2 pixels) to produce pixel data for the image corresponding to the second hierarchy. More specifically, the averaging circuit 2 forms a pixel value m1 for a pixel of the second hierarchical signal according to the formula m1=¼×(a+b+c+d). Accordingly, the averaging circuit 2 outputs a 4 pixel by 4 pixel portion of the image for the second hierarchy which corresponds to the 8 pixel by 8 pixel portion of the input image.

The signal output from the averaging circuit 2 is supplied to an averaging circuit 3 and also to an encoding circuit 7. The encoding circuit 7 encodes the signal supplied thereto and outputs an encoded second hierarchical signal via a second hierarchical output terminal 11.

The averaging circuit 3 calculates an average value of 4 pixels (2 pixels by 2 pixels) of the image corresponding to the second hierarchy. The resulting average value provided by the averaging circuit 3 corresponds to a pixel in the image corresponding to the third hierarchy. In other words, the averaging circuit 3 calculates the value of a pixel M1 of the third hierarchical signal according to the formula M1=¼× (m1+m2+m3+m4). As a result, the averaging circuit 3 generates a 2 pixel by 2 pixel portion of the image for the third hierarchy which corresponds to the 8 pixel by 8 pixel portion of the input signal.

The signal output from the averaging circuit 3 is supplied to an averaging circuit 4 and also to an encoding circuit 6. The encoding circuit 6 encodes the signal supplied thereto and outputs an encoded third hierarchical signal via a third hierarchical output terminal 10.

The averaging circuit 4 calculates an average value of 4 pixels (2 pixels by 2 pixels) of the third hierarchical signal. More specifically, the averaging circuit 4 calculates a pixel value M according to the formula M=¼×(M1+M2+M3+ M4). Accordingly, the averaging circuit 4 outputs a fourth hierarchical pixel signal which corresponds to an 8 pixel by 8 pixel portion of the input image. The output signal from the averaging circuit 4 is supplied to an encoding circuit 5, which, in turn, outputs an encoded fourth hierarchical output signal via a fourth hierarchical output terminal 9.

As can be seen from FIG. 3, the number of pixels in the higher-order hierarchical signals is decreased with respect to the first hierarchical signal by factors of 1:4, 1:16 and 1:64, respectively. Thus, if the area of the image is maintained constant, the resolution correspondingly decreases as the number of pixels decreases. On the other hand, if the distance between pixels is kept constant, the size of the image correspondingly decreases.

The encoding circuits 5, 6, 7 and 8 perform compression-encoding on the data to be transmitted. In addition, the encoding circuits 6, 7 and 8 corresponding to the lower-order hierarchical signals suppress part of the data supplied thereto for transmission. More specifically, the encoding circuits 6, 7 and 8 each omit from transmission one of every four pixels, thereby preventing the amount of data to be transmitted from increasing due to the provision of the hierarchical signals. For example, the encoding circuit 7 receives average values m1, m2, m3 and m4 from the averaging circuit 2. If data corresponding to all four of the average values were transmitted, the amount of data to be transmitted would increase, thus reducing transmission efficiency. To overcome this problem, the encoding circuit 7 omits from transmission one of the four average values, for example, m4. Similarly to encoding circuit 7, the encoding circuits 6 and 8 also omit from transmission one of every four pixel values. In FIG. 3, the lower right-hand pixel of every group of four pixels (2 pixels by 2 pixels) is marked with a slant line to indicate that such pixel is omitted from transmission. It will be understood that with respect to the second and third hierarchical signals, the omitted pixel is an average value of pixels in the next lower-order hierarchical signal, whereas in the first hierarchy, the omitted pixel is a pixel of the input signal.

Thus, the total number of pixel signals to be transmitted in such a hierarchical encoding system can be calculated by adding 48+12+3+1 (proceeding from the lowest hierarchical level to the highest hierarchical level), yielding a total of 64 pixels, which is the same as the number of pixels in the input image. It will be noted that a hierarchical encoding system has been provided without increasing the total number of pixels to be transmitted.

There will now be described, with reference to FIG. 2, a decoding apparatus according to the first embodiment of the invention, and corresponding to the encoding apparatus of FIG. 1.

Figure 2:
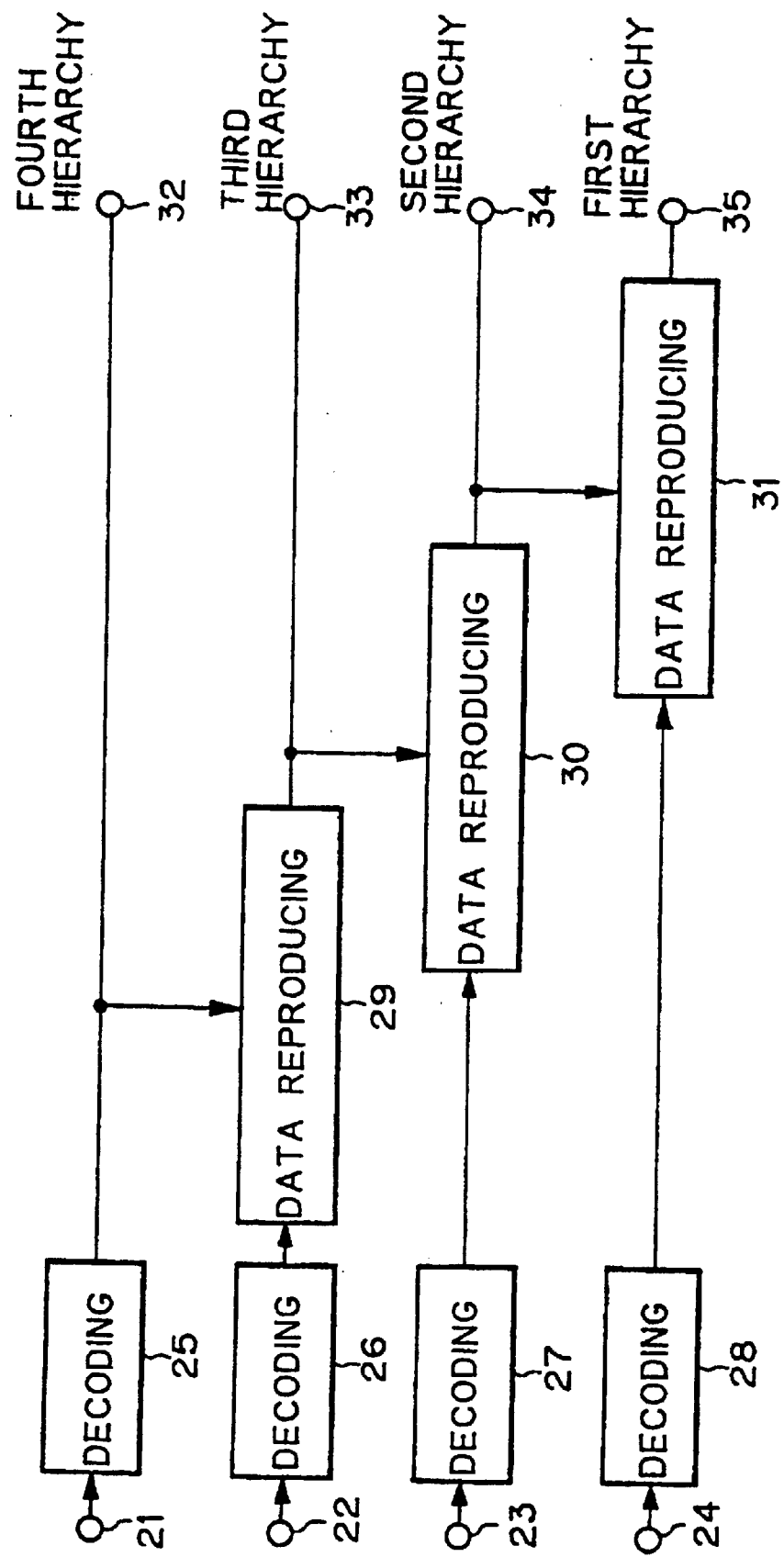
FIG. 2 is a block diagram of a decoding apparatus according to the first embodiment of the present invention.

In FIG. 2, fourth through first hierarchical data signals, transmitted from the above-described encoder, are respectively supplied to input terminals 21–24. Decoding circuits 25–28 are respectively connected to receive the signals provided at the input terminals 21–24. The decoding circuits 25–28 perform decoding that reverses the compression-encoding performed by the encoding circuits 5–8 of FIG. 1.

Continuing to refer to FIG. 2, the decoded output signal provided by decoding circuit 25 is supplied to a fourth hierarchical output terminal 32. The output signal from decoding circuit 25 is also supplied to a data reproducing circuit 29. The data reproducing circuit 29 also receives a decoded output signal from the decoding circuit 26. The data reproducing circuit 29 reconstructs data corresponding to pixels which were omitted from transmission on the encoder side. For example, if the data signal corresponding to pixel M4 was omitted from transmission, and consequently not received at the decoder of FIG. 2, the data reproducing circuit 29 calculates M4 according to the formula M4=4M− (M1+M2+M3) in order to reconstruct M4. It will be noted that the above formula is deriveable from the formula M=¼×(M1+M2+M3+M4), by which the corresponding fourth hierarchical pixel signal M was originally calculated on the encoder side. Thus the data reproducing circuit 29 outputs a third hierarchical output signal, including a reconstructed pixel signal, via a third hierarchical output terminal 33.

The output signal from the data reproducing circuit 29 is also supplied to a data reproducing circuit 30 which also receives a decoded output signal from the decoding circuit 27. The data reproducing circuit 29 reconstructs data which has not been transmitted in a similar manner to the processing performed by data reproducing circuit 29. In particular, if data corresponding to a pixel m4 has been omitted from transmission, the data for such pixel is reconstructed at the data reproducing circuit 30 according to the formula m4=4M1−(m1+m2+m3). The resulting reconstructed signal, along with signals corresponding to data pixels which were transmitted, is output from the data reproducing circuit 30 via a second hierarchical output terminal 34, and is also supplied to a data reproducing circuit 31.

The data reproducing circuit 31 also receives a decoded output signal from the decoding circuit 28. Again the data reproducing circuit 31 processes the data supplied thereto in a similar manner to the previously discussed data reproducing circuits 29 and 30. Again, assuming that the signal corresponding to a pixel d was omitted from transmission, this signal is reconstructed in the data reproducing circuit 31 according to the formula d=4m1−(a+b+c). The reconstructed signal, together with signals representing pixels that were not omitted from transmission, is output by the data reproducing circuit 31 as a first hierarchical output signal via a first hierarchical output terminal 35.

Thus, when a pixel signal in a desired hierarchical level is not directly represented in the received signal, the missing pixel signal can be reconstructed on the basis of a pixel signal in the next higher-order hierarchical signal. Where the pixel from the next hierarchical level also is not present, a pixel from still the next level can be used. In a worst case, the corresponding pixels in all levels except the highest level have not been transmitted, but even in this case the missing data can be reconstructed using the corresponding pixel in the highest hierarchical level.

Figure 4:
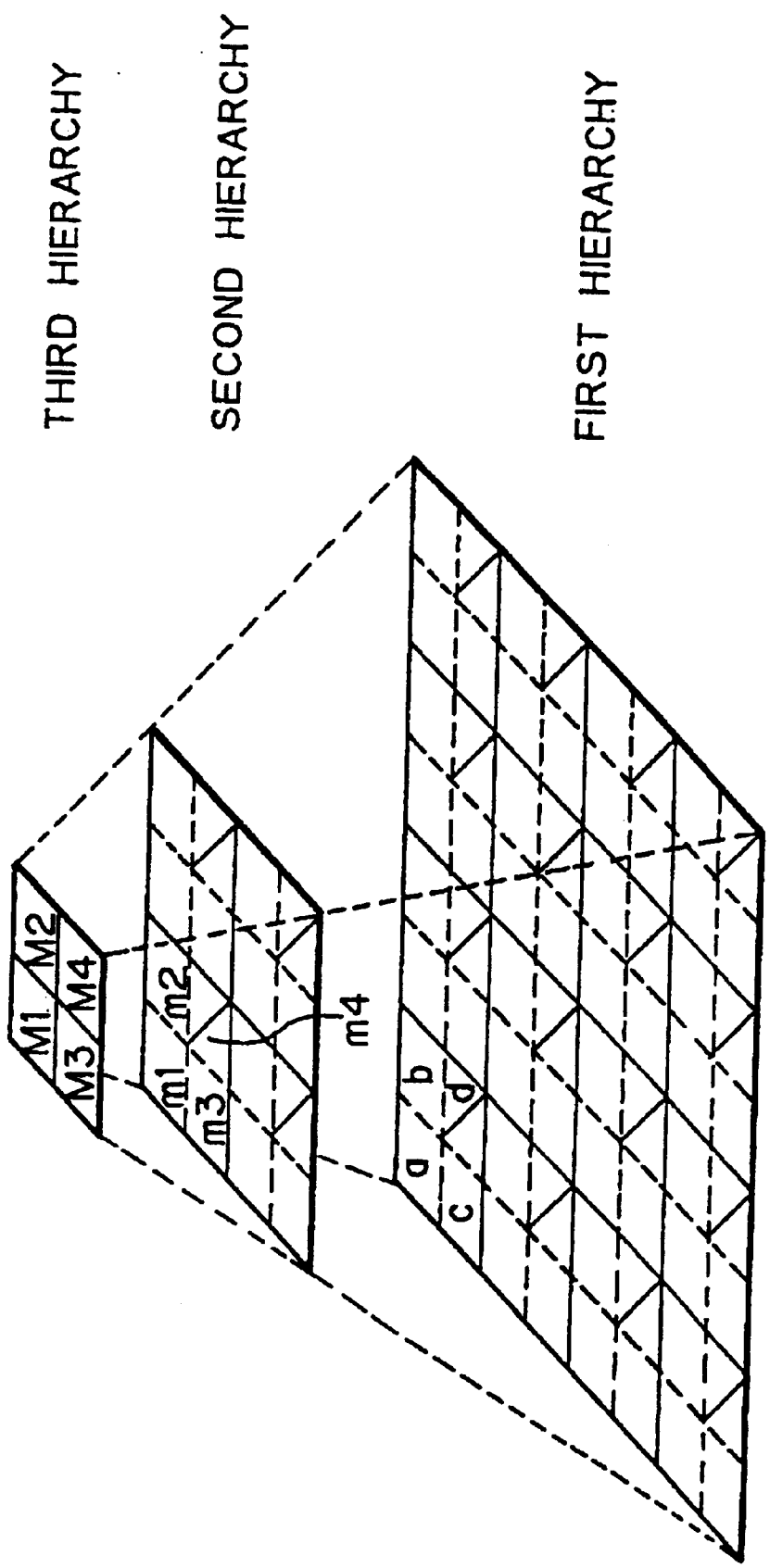
FIG. 4 is a schematic illustration of hierarchical encoding performed according to a second embodiment of the present invention.

A second preferred embodiment of the present invention will now be described with reference to FIGS. 4–6. In this second embodiment, as indicated by FIG. 4, three hierarchical signal levels are provided, rather than the four levels provided in the first embodiment shown in FIG. 1.

Figure 5:
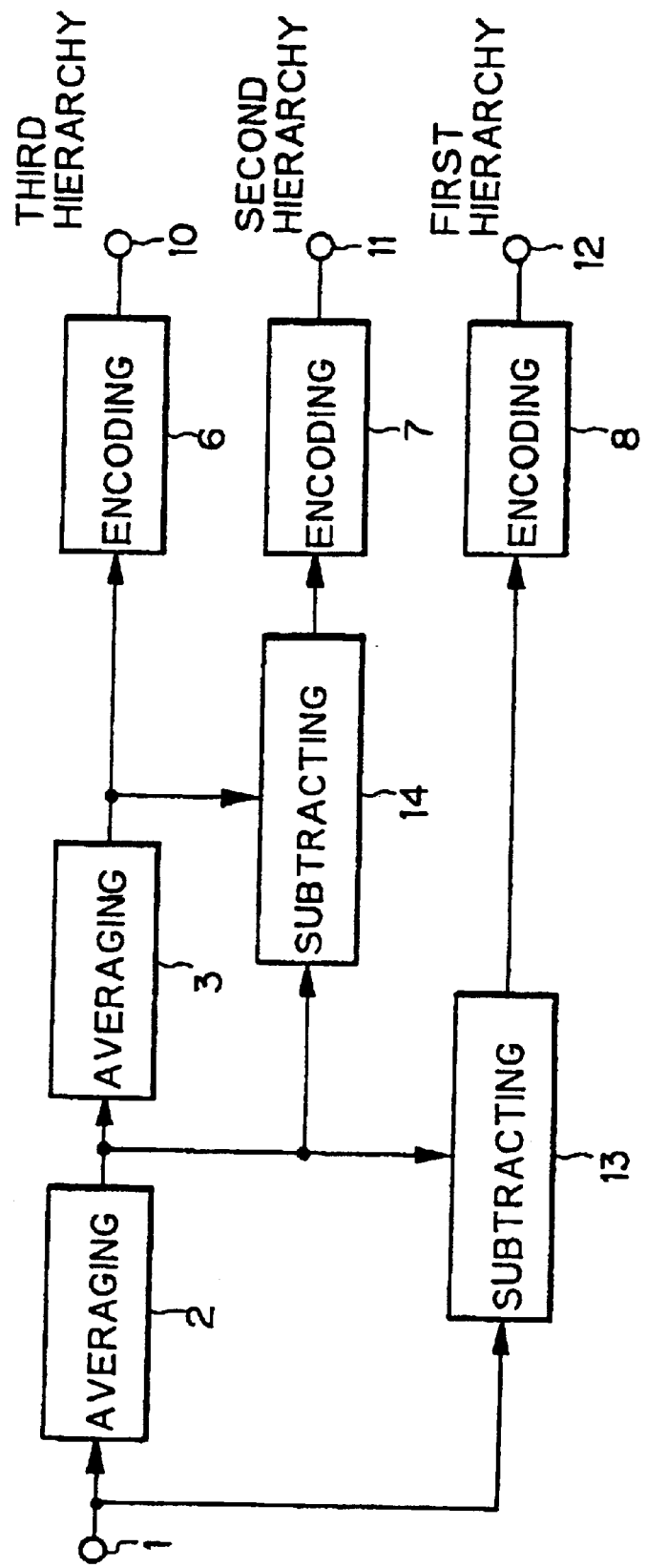
FIG. 5 is a block diagram of an encoding apparatus according to the second embodiment of the invention.

FIG. 5 illustrates an encoding apparatus in accordance with the second embodiment. Elements of the encoding apparatus of FIG. 5 which correspond to those of the encoder of FIG. 1 have been assigned the same reference numerals as in FIG. 1. An input digital image signal is provided at an input terminal 1 and this input signal is received from the input terminal 1 by an averaging circuit 2, as well as a subtracting circuit 13. The subtracting circuit 13 generates differential data by subtracting average values generated by the averaging circuit 2 from input image pixel signals (corresponding to first hierarchical signals). As in the embodiment of FIG. 1, averaging circuit 2 calculates a second hierarchical pixel signal value m1 as the average of four input pixels a, b, c, d, which form a 2 pixel by 2 pixel array in the input image. The subtracting circuit 13 forms differential data corresponding to three of the four pixels, omitting the fourth pixel, assumed in this case to be pixel d. In particular, the subtracting circuit 13 forms differential data according to the formulas $\Delta a = a - m1$, $\Delta b = b - m1$, and $\Delta c = c - m1$.

The resulting differential data output from the subtracting circuit 13 is supplied as a first hierarchical output signal to a first hierarchical output terminal 12 by way of an encoding circuit 8.

The output signal from the averaging circuit 2 is also supplied to an averaging circuit 3 and a subtracting circuit 14. In a similar manner to the subtracting circuit 13, the subtracting circuit 14 forms differential data on the basis of average values corresponding to second hierarchical signal pixels, as calculated by averaging circuit 2, as well as average value signals provided by averaging circuit 3. It will be recognized that averaging circuit 3 generates its output signals by averaging four signals provided thereto from the averaging circuit 2. The subtracting circuit 14 forms differential data according to the formulas $\Delta m1 = m1 - M1$, $\Delta m2 = m2 - M1$, and $\Delta m3 = m3 - M1$. As before, the subtracting circuit 14 does not form differential data corresponding to the fourth pixel value, m4.

Differential data output from the subtracting circuit 14 is supplied as a second hierarchical output signal to a second hierarchical output terminal 11 by way of an encoding circuit 7. Finally, the highest (i.e., third level) hierarchical signal is obtained by encoding the signals output by the averaging circuit 3 at an encoding circuit 6. The encoded third hierarchical signal is supplied to an output terminal 10 by the encoding circuit 6. No data signals formed by the averaging circuit 3 are omitted from transmission in the third hierarchical signal.

As is shown in FIG. 4, in the second embodiment the total number of pixels to be transmitted is 48+12+4=64, which is the same number of pixels as were present in the input image, even though three hierarchical signal levels are provided in the transmitted signal. (In FIG. 4, as in FIG. 3, each small square represents a pixel, and pixels marked with a slant line are omitted from transmission.)

It should be noted that the compression encoding carried out in encoding circuits 5, 6, 7 and 8 (in FIGS. 1 and 5) may employ linear quantization, non-linear quantization, or an adaptive quantization technique such as ADRC (Adaptive Dynamic Range Coding).

Figure 7:
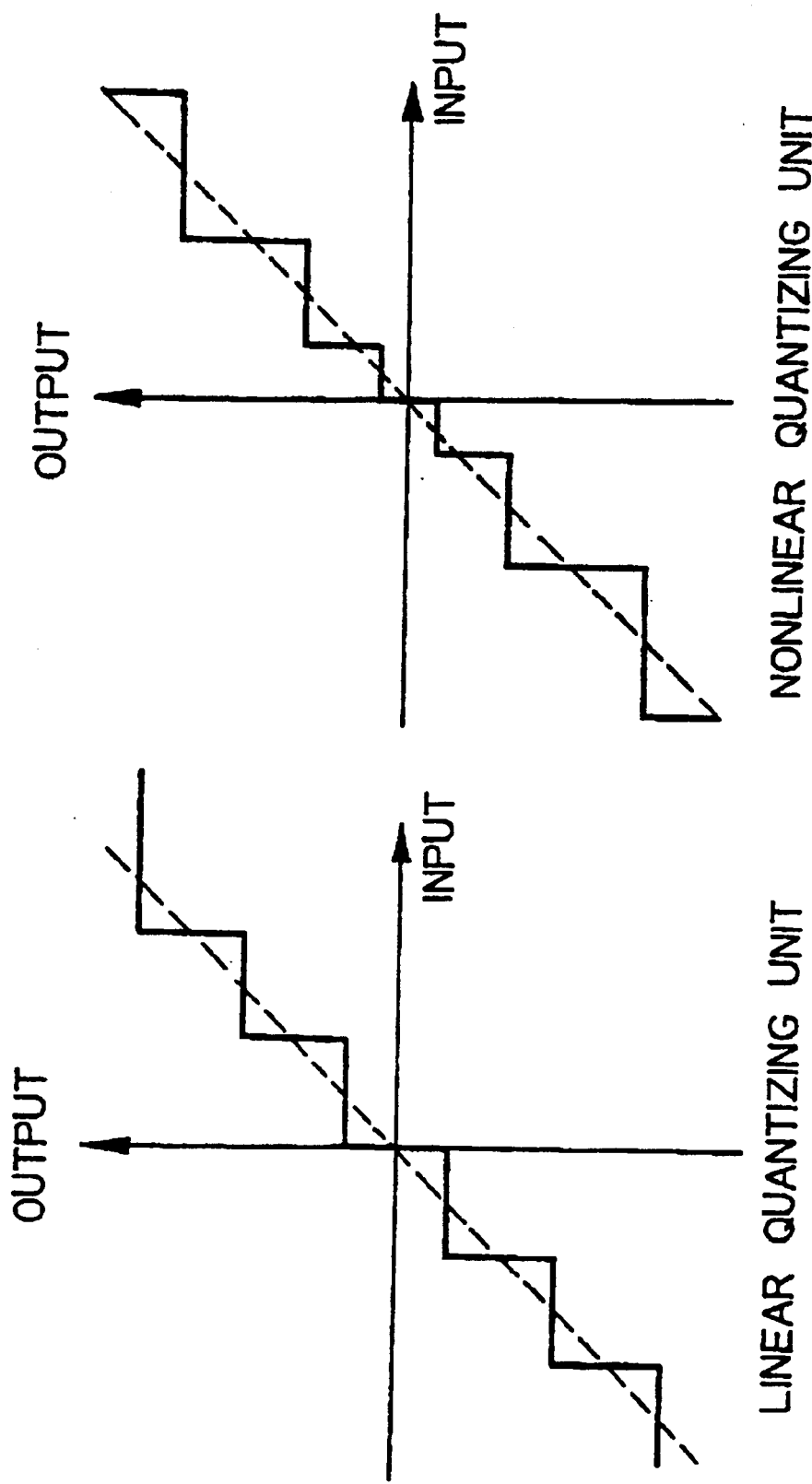
FIG. 7 schematically illustrates compression encoding techniques that may be used in the encoding apparatus according to the present invention.
Figure 8:
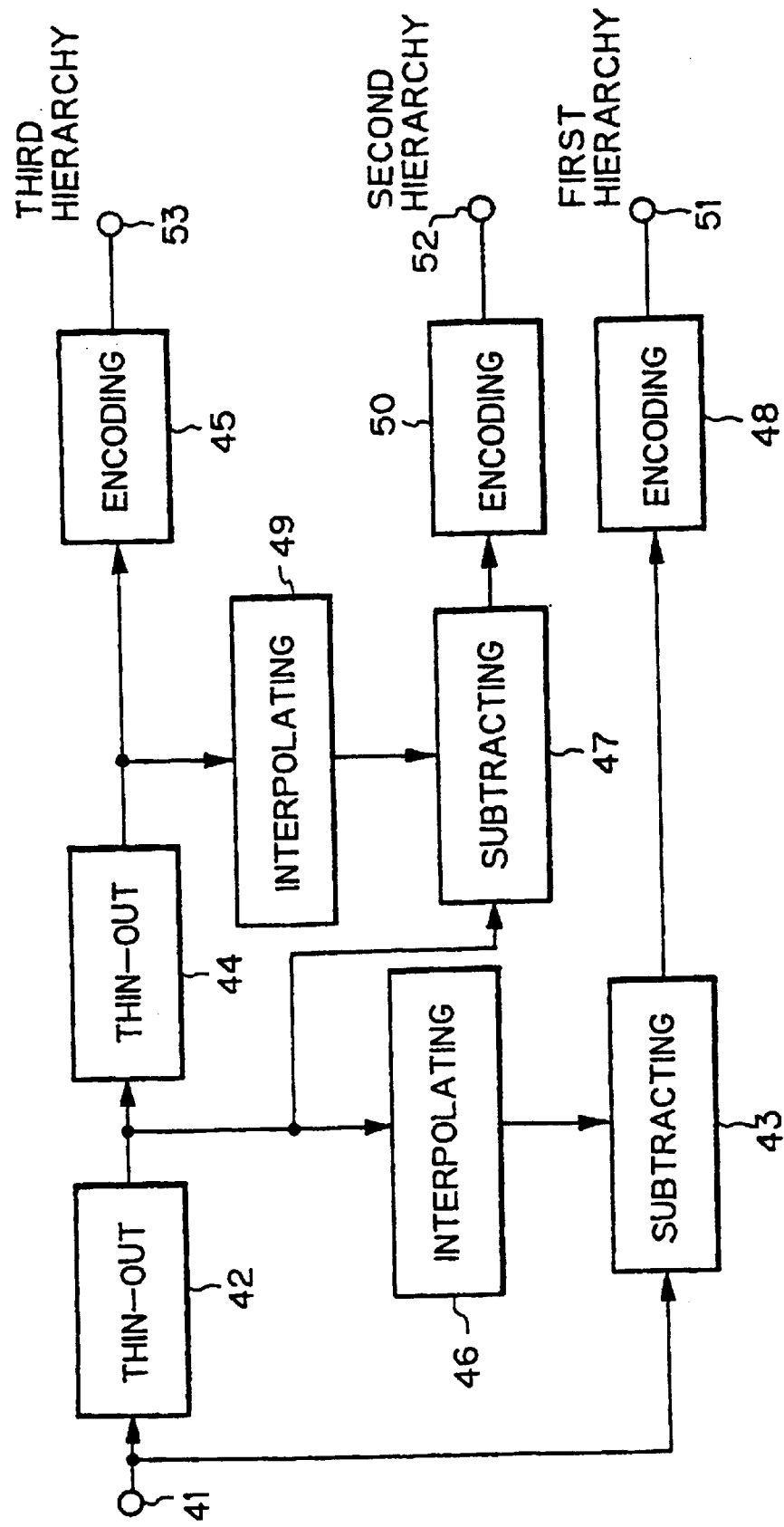
FIG. 8 is a block diagram of a conventional hierarchical encoding apparatus.
Figure 9:
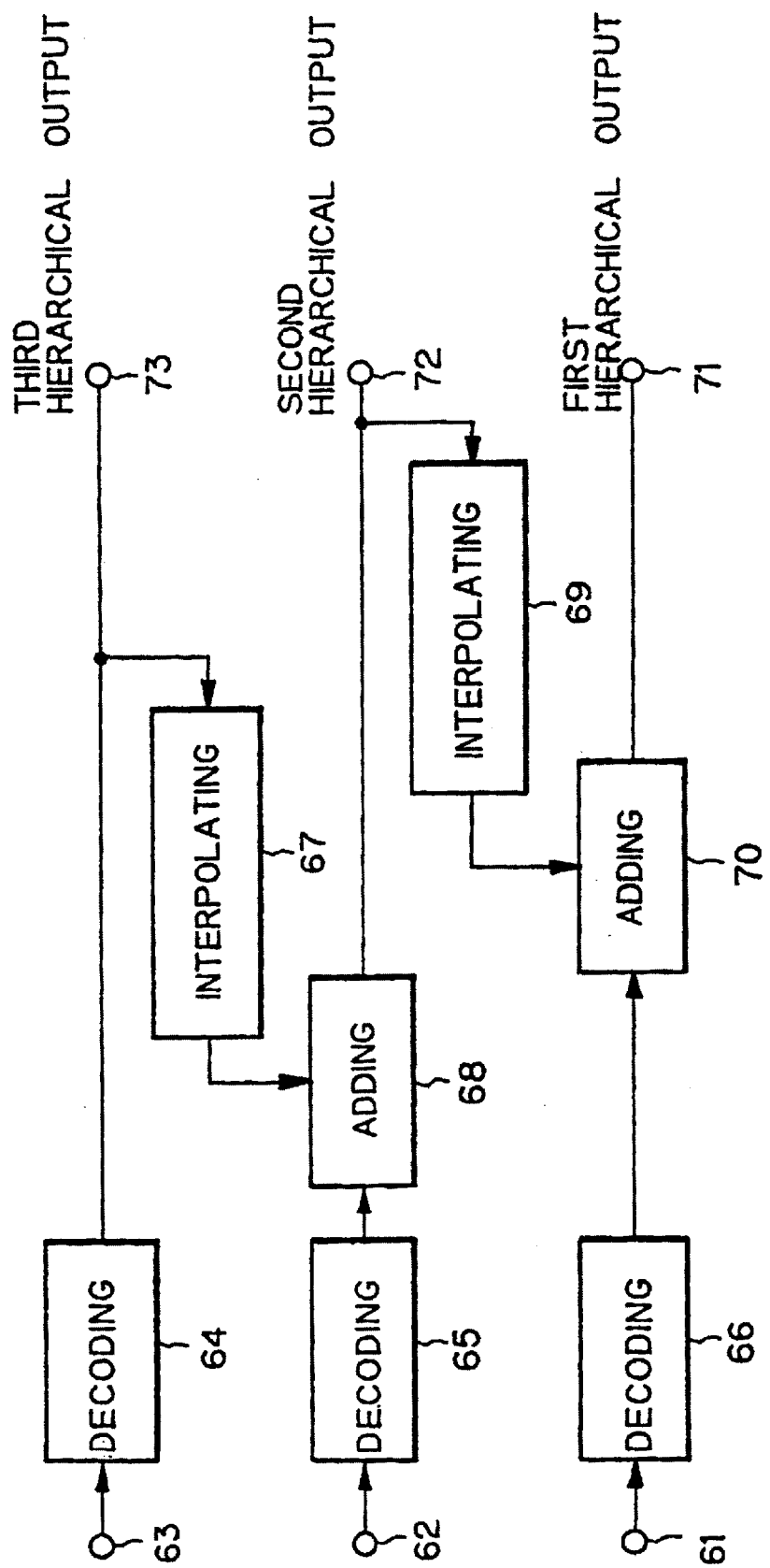
FIG. 9 is a block diagram of a conventional decoding apparatus corresponding to the encoding apparatus of FIG. 8.

The respective portions of FIG. 7 portray examples of quantizing techniques using linear quantizing units and non-linear quantizing units. Such techniques can reduce the number of bits transmitted per pixel, thereby compressing the total amount of data to be transmitted. These quantization-based compression coding techniques are well known to those who are skilled in the art, and so need not be further described.

Figure 6:
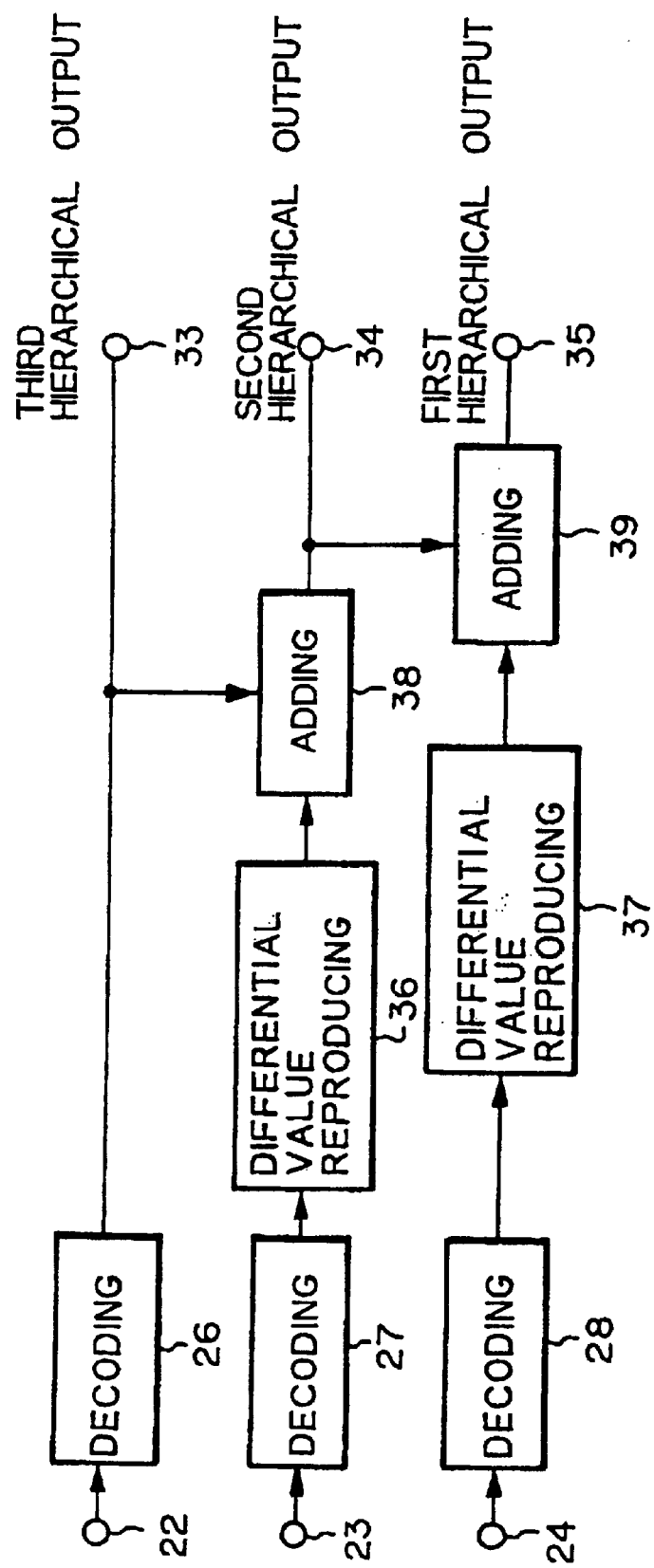
FIG. 6 is a block diagram of a decoding apparatus according to the second embodiment of the invention.

FIG. 6 illustrates a decoding apparatus which corresponds to the encoding apparatus of FIG. 5. As shown in FIG. 6, data signals corresponding to the third, second and first hierarchical levels are respectively provided at input terminals 22, 23 and 24. Decoding circuits 26, 27 and 28 are respectively connected to the input terminals 22, 23 and 24 to decode the respective hierarchical signals. It will be appreciated that the decoding performed in the decoding circuits 26–28 reverses the compression-encoding performed in the encoding circuits 6–8.

Decoded data output from the decoding circuit 26 is provided as a third hierarchical output signal at an output terminal 33.

The decoding circuits 27 and 28 respectively output decoded differential data corresponding to the second and first hierarchical levels. The differential data are respectively supplied to differential value reproducing circuits 36 and 37. The differential value reproducing circuits 36 and 37 each reconstruct a differential value that has been omitted from transmission on the basis of three differential values that have not been omitted. This can be done because, for example, $\Delta a + \Delta b + \Delta c + \Delta d = a + b + c + d - 4m1 = 0$. Thus, when $\Delta a$, $\Delta b$ and $\Delta c$ are all known, the missing first hierarchical value $\Delta d$ can be reconstructed at the differential value reproducing circuit 37 according to the formula $\Delta d=-(\Delta a+\Delta b+\Delta c)$. A similar calculation can be made at the differential value reproducing circuit 36 to reconstruct second hierarchical differential data that has been omitted from transmission. The differential data output from the differential value reproducing circuit 36, including transmitted differential values and reconstructed differential values, is supplied to an adding circuit 38, at which the differential values are added to decoded third hierarchical average value data provided from the decoding circuit 26. The resulting data signals output from the adding circuit 38 are provided as a second hierarchical output signal at an output terminal 34.

Similarly, differential data, including both transmitted and reconstructed values, is output from the differential value reproducing circuit 37 to an adding circuit 39, at which the first hierarchical output signal is formed by adding the differential data from the differential value reproducing circuit 37 to the second hierarchical signal data provided from the adding circuit 38. Thus, the adding circuit 39 outputs a first hierarchical output signal to an output terminal 35.

Completing the example given above with respect to the reproducing circuit 37, it will be understood that the "non-transmitted" pixel d is, in effect, reconstructed according to the formula $d=m1+\Delta d=m1-(\Delta a+\Delta b+\Delta c)$.

According to the second embodiment, if a data base of high definition television still images is provided, the first hierarchical output signal, available at the terminal 35, provides reproduced data having the same resolution as the original images, i.e., high definition television images. The second hierarchical output signal provides a reproduced image with the resolution of standard television images, and the third hierarchical output signal provides a high speed retrieval image with low resolution.

It will be recognized that when compression-encoding is used to decrease the amount of information to be transmitted, the reproduced image data obtained upon decoding may not be exactly the same as the original input image. However, there are known techniques for hiding the differences so that deterioration in image quality is not perceived. Although it is preferred to provide the compression-encoding circuits 5–8 as described with respect to FIGS. 1 and 5, it is also within the contemplation of the invention to dispense with such compression-encoding.

It should also be recognized that a weighted average calculation or the like can be employed in averaging circuits 2–4 of FIGS. 1 and 5, rather than the simple arithmetic mean calculation described above.

By using the techniques described above, the present invention makes it possible to provide a plurality of hierarchical data signals without increasing the number of pixel data signals to be encoded and transmitted. Thus, encoding efficiency is not reduced. Further, in order to minimize delay upon decoding, reconstruction of a non-transmitted pixel in a particular hierarchical signal is performed on the basis of a pixel signal in the next higher hierarchical level. Moreover, because an averaging process is performed to generate higher-order hierarchical signals, interpolating filters are not required, thereby preventing the hardware scale from increasing.

Having described specific preferred embodiments of the present invention with reference to the accompanying drawings, it is to be understood that the invention is not limited to those precise embodiments, and that various changes and modifications may be effected by one skilled in the art without departing from the scope or spirit of the invention as defined in the appended claims.

What is claimed is:

1. An apparatus for encoding an input digital video signal to produce at least first and second hierarchical data signals which respectively represent a first video signal and a second video signal having a resolution that is lower than a resolution of the first video signal, the apparatus comprising:

means for receiving the input digital video signal and for generating the second hierarchical data signal by calculating each pixel data signal of the second hierarchical data signal as a weighted average of a number (N) of pixel data signals of the input digital video signal; and means for outputting the generated second hierarchical data signal together with first hierarchical pixel data signals representing only N−1 of the N pixel data signals of the input digital video signal.

2. An apparatus according to claim 1, wherein said means for receiving and generating includes means for calculating a weighted average value of four pixel data signals a, b, c, d of the input digital video signal to produce a pixel data signal m1 of the second hierarchical data signal.

3. An apparatus according to claim 2, further comprising means for subtracting the weighted average value pixel data signal m1 from each of the input pixel data signals a, b, c to produce differential data signals $\Delta a$, $\Delta b$, $\Delta c$; and wherein said weighted average value pixel data signal m1 is output as a pixel data signal of the second hierarchical data signal, and the differential data signals $\Delta a$, $\Delta b$, $\Delta c$ are output as the first hierarchical pixel data signals representing only the N−1 pixel data signals of the input digital video signal.

4. An apparatus according to claim 3, wherein the means for outputting includes means for compressing the first and second hierarchical data signals before outputting the first and second hierarchical data signals.

5. An apparatus for decoding first and second hierarchical data signals which respectively represent a first video signal and a second video signal having a resolution that is lower than a resolution of the first video signal, the apparatus comprising:

means for receiving a pixel data signal of the second hierarchical data signal, which was produced as a weighted average of a number (N) of pixel data signals of an input digital video signal, and data signals representing N−1 pixels of the first hierarchical data signal; and means for calculating an Nth pixel data signal of the first hierarchical data signal from the received pixel data signal of the second hierarchical data signal and the received data signals representing N−1 pixels of the first hierarchical data signal.

6. An apparatus according to claim 5, wherein N=4 and the means for calculating calculates the Nth pixel data signal by subtracting a sum of the received data signals representing the N−1 pixels from four times the received pixel data signal of the second hierarchical data signal.

7. An apparatus according to claim 5, wherein the received data signals representing the N−1 pixels are differential signals, and the means for calculating calculates the Nth pixel data signal by subtracting a sum of the received data signals representing the N−1 pixels from the received pixel data signal of the second hierarchical data signal.

8. An apparatus according to claim 7, further comprising means for reconstructing each of N−1 pixel data signals of the first hierarchical data signal by adding a respective one of the received data signals representing the N−1 pixels to the received pixel data signal of the second hierarchical data signal.

9. An apparatus according to claim 5, wherein the received data signals are compressed data signals, and further comprising means for decompressing the received data signals.

10. A method of encoding an input digital video signal to produce at least first and second hierarchical data signals which respectively represent a first video signal and a second video signal having a resolution that is lower than a resolution of the first video signal, the method comprising the steps of:

receiving the input digital video signal;

generating the second hierarchical data signal by calculating each pixel data signal of the second hierarchical data signal as a weighted average of a number (N) of pixel data signals of the received input digital video signal; and outputting the generated second hierarchical data signal together with first hierarchical pixel data signals representing only N−1 of the N pixel data signals of the input digital video signal.

11. A method according to claim 10, wherein said generating step includes calculating a weighted average value of four pixel data signals a, b, c, d of the input digital video signal to produce a pixel data signal m1 of the second hierarchical data signal.

12. A method according to claim 11, further comprising the step of subtracting the weighted average value pixel data signal m1 from each of the input digital data signals a, b, c to produce differential data signals $\Delta a$, $\Delta b$, $\Delta c$; and wherein said outputting step includes outputting said weighted average pixel data signal m1 as a pixel data signal of the second hierarchical data signal and outputting the differential data signals $\Delta a$, $\Delta b$, $\Delta c$ as the first hierarchical pixel data signals representing only the N−1 pixel data signals of the input digital video signal.

13. A method according to claim 12, further comprising the step of compressing the first and second hierarchical data signals before outputting the first and second hierarchical data signals.

14. A method of decoding first and second hierarchical data signals which respectively represent a first video signal and a second video signal having a resolution that is lower than a resolution of the first video signal, the method comprising the steps of:

receiving a pixel data signal of the second hierarchical data signal, which was produced as a weighted average of a number (N) of pixel data signals of an input digital video signal, and data signals representing N−1 pixels of the first hierarchical data signal; and calculating an Nth pixel data signal of the first hierarchical data signal from the received pixel data signal of the second hierarchical data signal and the received data signals representing N−1 pixels of the first hierarchical data signal.

15. A method according to claim 14, wherein N=4 and said calculating step includes subtracting a sum of the received data signals representing the N−1 pixels from four times the received pixel data signal of the second hierarchical data signal to produce the Nth pixel data signal.

16. A method according to claim 14, wherein the received data signals representing the N−1 pixels are differential signals, and said calculating step includes subtracting a sum of the received data signals representing the N−1 pixels from the received pixel data signal of the second hierarchical data signal to produce the Nth pixel data signal.

17. A method according to claim 16, further comprising the step of reconstructing each of N−1 pixel data signals of the first hierarchical data signal by adding a respective one of the received data signals representing the N−1 pixels to the received pixel data signal of the second hierarchical data signal.

18. A method according to claim 14, wherein the received data signals are compressed data signals, and further comprising the step of decompressing the received data signals.

19. An apparatus for forming at least first, second and third encoded hierarchical data signals, said apparatus comprising:

means for receiving an input digital video signal representing data of a plurality of groups of pixels in which each group has a number (N) of said pixels and for encoding the data of N−1 pixels of each of said groups so as to form the first encoded hierarchical signal;

means receiving said input digital video signal for weight averaging the data representing the N pixels of each of said groups of pixels so as to form at least one group of weight averaged data in which each weight averaged data group has a number (M) of weighted average data values;

means for encoding M−1 weighted average data values of each said weight averaged data group so as to form the encoded second hierarchical signal; and means for weight averaging the data values of each said weight averaged data group and for forming the encoded third hierarchical data signal therefrom.

20. An apparatus according to claim 19, wherein N is equal to M.

21. An apparatus according to claim 19, wherein the means for weight averaging the data representing the N pixels and the means for weight averaging the data values of each said weight averaged data group perform a weighted average calculation.

* * * * *